Patented May 15, 1951

2,552,531

UNITED STATES PATENT OFFICE 2,552,531

PROCESS FOR BREAKING PETROLEUM EMULSIONS

Melvin De Groote, St. Louis, Mo., assignor to Petrolite Corporation, Ltd., Wilmington, Del., a corporation of Delaware No Drawing. Application August 10, 1949, Serial No. 109,619

8 Claims. (Cl. 252—344)

This invention relates to processes or procedures particularly adapted for preventing, breaking or resolving emulsions of the water-in-oil type, and particularly petroleum emulsions.

Complementary to the above aspect of the invention herein disclosed is my companion invention concerned with the new chemical products or compounds used as the demulsifying agents in said aforementioned processes or procedures, as well as the application of such chemical products, compounds, or the like, in various other arts and industries, along with the method for manufacturing said new chemical products or compounds which are of outstanding value in demulsification. See my copending application, Serial No. 107,382, filed July 28, 1949.

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

In my co-pending applications, Serial Nos. 104,801, 104,802, 104,803, and 104,804, all filed July 14, 1949, I have described the breaking of petroleum emulsions by means of certain polyol ethers. Said inventions, or invention, described in the aforementioned co-pending applications may, in the broadest aspect, be considered as being concerned with a process for breaking petroleum emulsions of the water-in-oil type characterized by subjecting the emulsion to the action of a demulsifier including high molal oxypropylation derivatives of monomeric polyhydric compounds with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-soluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristics of the oxypropylation end product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than $12\frac{1}{2}\%$ by weight of the oxypropylation end product on a statistical basis, and (i) the preceding provisos being based on complete reaction involving the propylene oxide and the initial polyhydric reactant.

In another co-pending application, Serial No. 107,381, filed July 28, 1949, attention was directed to another invention which is somewhat akin to the aforementioned invention, or inventions, insofar that it involves also a high molal polyol obtained by the action of propylene oxide but containing in addition basic nitrogen atoms. Stated another way, in that invention the initial material employed, instead of being a carbohydrate as exemplified by mannitol, sorbitol, sorbitan, etc., is a polyamine or an oxyalkylated derivative thereof, such as diethylene triamine, triethylene tetramine, or tetraethylene pentamine, or compounds which bear a simple genetic relationship thereto without any basic change in the structure as, for example, the glycide derivatives of such amines, and ethylene oxide derivatives of such amines, the low molal acyl derivatives of such amines, the low molal alkyl derivatives of such amines, etc. It is also obvious that there is another difference between initial reactants of that invention and the initial reactants employed as raw materials in the above mentioned copending applications, i. e., Serial Nos. 104,801, 104,802, 104,803, and 104,804, all filed July 14, 1949. This difference is the fact that the raw materials employed may be reactive towards propylene oxide by virtue of an amino hydrogen atom as distinguished from a labile hydrogen atom attached to an oxygen atom as in the case of sorbitol, sorbitan, etc.

In evaluating the broad generic invention described immediately preceding, I stated as follows:

"However, without any reservation as to immediate availability in the open market I would select the same higher alkylene polyamines which had been treated with glycide in the ratio of at least one mole of glycide per reactive hydrogen, as an outstanding reactant for combination with propylene oxide. In fact, such oxypropylated derivatives are so outstanding that they represent an invention-within-an-invention."

The present invention is concerned with this invention-within-an-invention previously referred to in my aforementioned co-pending application, Serial No. 107,381, filed July 28, 1949.

The present invention in its broadest aspect is concerned with a process for breaking petroleum emulsions of the water-in-oil type characterized by subjecting the emulsion to the action of a demulsifier including high molal oxypropylation derivatives of monomeric polyamino compounds with the priviso that (a) the initial polyamino reactant be free from any radical having at least 8 uninterrupted carbon atoms; (b) the initial polyamino reactant have a molecular weight of not over 2,000 and at least a plurality of reactive hydrogen atoms, at least part of which are an integral part of a glycide radical obtained by the reaction of at least one mole of glycide on a polyamino compound; (c) the initial polyamino reactant must be water-soluble; (d) the oxypropylation end product must be water-insoluble; (e) the oxypropylation end product be within the molecular weight range of 2000 to 30,000 on an average statistical basis; (f) the solubility characteristics of the oxypropylation end product in respect to water must be substantially the result of the oxypropylation step; (g) the ratio of propylene oxide per initial reactive hydrogen atom must be within the range of 7 to 70; (h) the initial polyamino reactant must represent not more than 20% by weight of the oxypropylation end product on a statistical basis; (i) the preceding provisos are based on the assumption of complete reaction involving the propylene oxide and initial polyamino reactant; (j) the polyamino reactant must contain at least one basic nitrogen atom; and (k) the nitrogen atoms are linked by a carbon atom chain.

Reference to "basic nitrogen atom" refers to one which is not attached to a negative group such as aryl or acyl. Phenylethylenediamine or acetylethylenediamine both quality as polyamines for the purpose of this description.

In the foregoing summarization of the invention in its various aspects and in the claims reference to monomeric is not intended to exclude compounds such as diethylene triamine, triethylene tetramine, or tetraethylene pentamine but is intended to differentiate from linear polymers or dimers, or other higher polymeric types, obtained, for example, by reaction between a dicarboxy acid, such as adipic acid, and tetraethylene pentamine, or the like.

Briefly stated, the present invention is concerned with breaking petroleum emulsions by means of certain polyol ethers of certain hereinafter specified polyamino compounds as exemplified by glycerol ethers obtained by the action of glycide on diethylene triamine, triethylene tetramine, and tetraethylene pentamine. The preparation of such oxypropylation derivatives is described hereinafter in detail. Such ethers are obtained by treating a water-soluble polyamino reactant having a plurality of functional groups (hydrogen atoms attached to oxygen or nitrogen so as to be reactive toward an alkylene oxide) with propylene oxide. A plurality of propylene oxide is used in molal proportion to the polyamino reactant so as to convert the initial water-soluble product into an ultimate resultant which is water-insoluble.

For instance, the herein described resultants, or more correctly products of reaction since they invariably and inevitably represent cogeneric mixtures rather than a single component, when mixed with distilled water so as to give a 5% solution, suspend after a fashion during vigorous agitation but on being allowed to stand in a quiescent stage immediately separate out so that within a short length of time, for instance, within a few minutes to several hours, all or substantially all the big bulk of material has separated from the aqueous solution or suspension. In fact, in the higher stages of oxypropylation the materials obtained seem to go into water at room temperature with considerable difficulty and if the water happens to be warm, for instance, at a temperature of 50°, 60°, or 70° C., the materials are even less soluble. An example of a product difficult to disperse even with vigorous shaking and which, even so, does not stay dispersed, is the resultant obtained by treating one mole of tetraethylene pentamine with 200 moles of propylene oxide. Reference as to solubility is in ordinary cold water at approximately room temperature, for instance, 22.5° C., or thereabouts.

For convenience, what is said hereinafter is divided into three parts. Part 1 is concerned with the description of the polyamino reactants employed, as well as reference to other compounds, products, etc., so there may be a clear line of demarcation between the present invention and what may appear elsewhere. Part 2 is concerned with the preparation of the oxypropylated derivatives, and Part 3 is concerned with the use of an oxypropylated derivative as a demulsifier for petroleum emulsions of the water-in-oil type.

PART 1

In the present invention the initial reactants are characterized by certain features which have been pointed out in some detail previously. Suitable reactants are exemplified by compounds previously mentioned, that is, the glycerol ethers obtained by the action of glycide on diethylenetriamine, triethylenetetramine, and tetraethylenepentamine. The higher polyamines in this series are equally satisfactory for reaction with glycide such as pentaethylene hexamine, hexaethylene heptamine, heptaethylene octamine, etc. The reaction involving glycide may be conveniently divided into three classes based on the amount of glycide employed. One can use at least one mole of glycide but an insufficient amount to convert all reactive or amino hydrogen atoms (assuming that reaction takes place at the amino hydrogen atom throughout before reaction takes place at a hydroxyl hydrogen atom) into glycide or glycerol ether radicals. In the second instance one may add a stoichiometric amount of glycide to at least hypothetically convert each amino hydrogen atom or hydroxyl hydrogen atom into a glycerol radical. In the third place, one may use more than the stoichiometric amount so that one obtains at least one or more polyglycide radicals, or better still polyglycerol radicals corresponding to acyclic diglycerol, acyclic triglycerol, etc.

In some instances the carbon atom chain uniting two nitrogen atoms may, itself, be substituted by the presence of a hydroxyl radical or a ketonic oxygen atom, or a methyl radical. It is preferable that the polyamino compound has at least two basic nitrogen atoms and at least 4 reactive hydrogen atoms. As has been stated previously there are any one of a number of compounds derived from polyamines bearing a simple genetic relationship to such amines which are just as satisfactory for use as initial reactants.

The polyamine employed for initial reaction with glycide prior to subsequent oxypropylation can be treated with ethylene oxide, butylene oxide, methyl glycide, or a combination of such oxyalkylating agents. Such polyamine, of course, can be treated with propylene oxide in an amount up to two or three times the number of amino hydrogen atoms present and then with glycide. Needless to say, the amine after treatment with glycide can be treated with propylene oxide at an initial stage but such product need not be considered as an initial reactant for the reason that it is more convenient to consider the treatment with propylene oxide, as part of the final oxypropylation stage, whether added as a single step or stepwise. One could produce either salts or amines of low molal acids, such as acetic acid, formic acid, hydroxyacetic acid, lactic acid, and the like; or the ultimate final product can be converted into a salt by reaction with these acids, or by reaction with inorganic acids such as hydrochloric acid, sulfuric acid, phosphoric acid, etc. One can introduce readily low molal acyl radicals as stated, or alkyl radicals, by use of conventional alkylating agents such as dimethyl sulfate, etc. Ether radicals can be introduced in the usual manner. However, all such derivatives are characterized by the fact that they still meet all the requirements set forth elsewhere as to water-solubility, presence of reactive hydrogen atoms, presence of basic nitrogen atoms, etc., and thus obviously bear a simple genetic relationship to the initial polyamino compound.

Polyamines and particularly basic polyamines of the kind herein described react immediately and almost violently with glycide. The reaction presents no problem except in the matter of hazard involved in controlling the reaction. What is said in the paragraphs immediately following is the description of polyamines which can be employed as raw materials for reaction with glycide to give the initial reactant.

The polyamines are obtained in various manners, such as reaction involving ethylene dichloride, propylene dichloride, butylene dichloride, or the like, with ammonia, or other amines. Note particularly the amines described in the following patents: U. S. Patents Nos. 2,049,467, dated August 4, 1936, to Mnookin; 1,952,008, dated March 20, 1934, to Bruson; 1,951,992, dated March 20, 1934, to Perkins; and 2,291,396, dated July 28, 1942, to Lieber.

Other methods involve hydrogenation procedures. See U. S. Patents Nos. 2,317,757, dated April 27, 1943, to Graf; 2,408,172, dated September 24, 1946, to Johnson; 2,318,729, dated May 11, 1943, to Wilson; and 2,364,178, dated December 5, 1944, to Wilson.

In some instances amines having 10, 12, 15 or 20 basic nitrogen atoms are obtained by merely treating amines of the type described elsewhere, such as the polyethylene amines of ethylene imine. In a few cases an unsaturated group may be present; see U. S. Patents Nos. 2,440,724, dated May 4, 1948, to Morey, and 2,441,669, dated May 18, 1948, to Morey.

In some cases amines which otherwise qualify, except in the matter of water-solubility, may be treated with one of the alkylene oxides previously mentioned which is ethylene oxide, or glycide, or with ethylene imine or a combination so as to yield a suitable initial raw material. See, for instance, the table found on page 2 of U. S. Patent No. 2,393,825, dated January 29, 1946, to Senkus. See also certain amines described in U. S. Patent No. 2,262,357, dated November 11, 1941, to De Groote. Note the suitable amines depicted and described in U. S. Patent No. 2,391,830, dated December 25, 1945, to Jayne et al., which include, among others, the following: Hydroxy ethyl ethylene diamine; 1,2-di-(2'-ethanolamino)-ethane; 1,2 - di - (2',3' - propandiol-amino)-ethane; 1,3-di-(2'-ethanolamino)-2-propanol; N-1',2'-diamino - propylamino - 2 - ethanol; 1,2-di - (ethanolamino) - 3 - aminopropane; 1,2,3 - tri - (ethanolamine) - propane; tri-(mono-methyl-amino-methyl)-ethanol; and 1,2-di-(4'-cyclohexanolamino)-ethane.

Other suitable amines are described in U. S. Patent No. 2,046,720, dated July 7, 1936, to Bottoms, which were the following: N-(2-hydroxy-3-amino propyl)-ethylene diamine-1,2; N-dimethyl-N'-(2-hydroxy-3-amino propyl) - ethylene diamine-1,2; N-N'-diethyl-N'-(2-hydroxy-3-amino propyl)-ethylene diamine-1,2; N-(2-hydroxy-3-amino propyl)-N' - (2,3 - dihydroxy - 4 - aminobutyl) - ethylene diamine - 1,2; N - (2 - hydroxy - 3 - amino propyl) - 2 - hydroxy propylene diamine-1,3; and N,N'-di(2-hydroxy-3-amino propyl)-2-hydroxyl propylene diamine-1,3.

Where propylene or butylene dichloride is used for reaction with ammonia to yield amines, the chlorine atoms may be attached to two adjacent carbon atoms. The result is that such amines have a carbon atom chain substituted by a methyl or ethyl group. Where glycerol monochlorohydrin, or glycerol dichlorohydrin, is used for reaction with ammonia or the like to produce amines, one or more carbon atoms may be substituted by a hydroxyl radical. Similarly, a carbon atom may have an oxygen atom attached thereto. Reference is made to U. S. Patent No. 2,262,358, dated November 11, 1941, to De Groote. Note the description of the following amines:

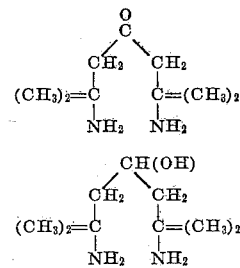

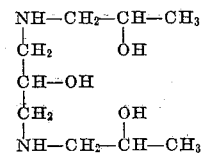

(See German Patent No. 96,657, March 1, 1898.)

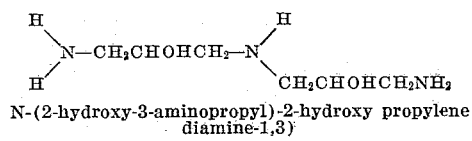

(See German Patent No. 635,904, to I. G. Farbenindustrie, A.-G., dated October 1, 1946.)

N-(2-hydroxy-3-aminopropyl)-2-hydroxy propylene diamine-1,3)

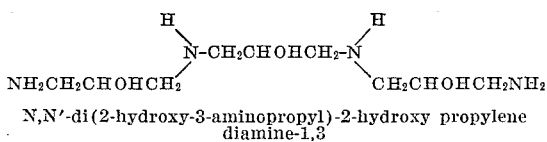

N,N'-di(2-hydroxy-3-aminopropyl)-2-hydroxy propylene diamine-1,3

A variety of other suitable amines are described in the following patents: U. S. Patent No. 2,048,990, dated July 28, 1936, to Britton et al.; U. S. Patent No. 2,149,273, dated March 7, 1939, to Carothers; U. S. Patent No. 1,790,042, dated January 27, 1931, to Eisleb; U. S. Patent No. 2,246,524, dated June 24, 1941, to Kyrides; U. S. Patent No. 2,368,521, dated January 20, 1945, to Clifford et al.; U. S. Patent No. 2,368,968, dated February 6, 1945, to Christmann.

As to the preparation of a variety of suitable polyamines using ethylene imine, see U. S. Patent No. 2,318,729, dated May 11, 1943, to Wilson.

PART 2

As far as I am aware, although a variety of amines are available in the open market the glycide derivatives which become the initial products of subsequent oxypropylation are not available and must be prepared. The reaction between these amines, since they are basic, and glycide presents no problem except the hazard involved in the reaction which takes place rapidly and possibly with violence, if not controlled. Needless to say, no catalyst need be added and, in fact, none should be added. Indeed, this applies also to the early stages of oxypropylation of the derivatives obtained by glycide.

Attention is directed to the fact that the use of glycide requires extreme caution. This is particularly true on any scale other than small laboratory or semi-pilot plant operations. Purely from the standpoint of safety in the handling of glycide, attention is directed to the following: (a) If prepared from glycerol monochlorohydrin this product should be comparatively pure; (b) the glycide itself should be as pure as possible, as the effects of impurities are difficult to evaluate; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separatable glass resin pot as described in the co-pending application of Melvin De Groote and Bernhard Keiser, Serial No. 82,704, filed March 21, 1949 (now Patent No. 2,499,370, dated March 7, 1950), and offered for sale by numerous laboratory supply houses. If such arrangement is used to prepare laboratory scale duplications, then care should be taken that the heating mantle can be removed rapidly so as to allow for cooling; or better still, through an added opening at the top, the glass resin pot or comparable vessel should be equipped with a stainless steel cooling coil so that the pot can be cooled more rapidly than mere removal of mantle. If a stainless steel coil is introduced it means that conventional stirrer of the paddle type is changed into the centrifugal type which causes the fluid or reactants to mix due to swirling action in the center of the pot. Still better, is the use of a laboratory autoclave of the kind previously described in this section; but in any event, when the initial amount of glycide is added to a suitable reactant, the speed of reaction should be controlled by the usual factors, such as (a) the rate of addition of glycide; (b) the elimination of external heat, and (c) use of cooling coil so there is no undue rise in temperature. All the foregoing is merely conventional but is included due to the hazard in handling glycide.

In actual practice I have found it feasible to use the same laboratory autoclave for treatment with glycide as used in oxypropylation as described subsequently. In using this piece of equipment for glycide reactions one need not be concerned with the fact that the equipment will stand pressure but it is a convenient piece of apparatus when only two changes are made; (a) the bomb arrangement for addition of propylene oxide is closed since glycide does not have to be added under pressure, and (b) a metal-to-glass connection is made so that glycide can be added from an ordinary separatory funnel directly into the metal autoclave. Another change which is made is that a vent which is ordinarily plugged off is connected by a metal-to-glass connection with an ordinary water-cooled glass condenser. In other words this condenser is left open so the glycide is added dropwise, using the stirring equipment, temperature control, water-cooling equipment, etc., of the autoclave. In essence, it becomes nothing more nor less than a convenient piece of equipment on a somewhat larger scale of the glass resin pot arrangement previously described.

The oxypropylation procedure employed in the preparation of derivatives from glycide-treated reactants has been uniformly the same, particularly in light of the fact that a continuous operating procedure was employed. In this particular procedure the autoclave was a conventionl autoclave, made of stainless steel and having a capacity of approximately one gallon, and a working pressure of 1,000 pounds' gauge pressure. The autoclave was equipped with the conventional devices and openings, such as the variable stirrer operating at speeds from 50 R. P. M. to 500 R. P. M., thermometer well and thermocouple for mechanical thermometer; emptying outlet; pressure gauge; manual vent line; charge hole for initial reactants; at least one connection for conducting the incoming alkylene oxide, such as propylene oxide, to the bottom of the autoclave; along with suitable devices for both cooling and heating the autoclave, such as a cooling jacket and, preferably, coils in addition thereto, with the jacket so arranged that it is suitable for heating with steam or cooling with water, and further equipped with electrical heating devices. Such autoclaves are, of course, in essence small scale replicas of the usual conventional autoclave used in oxyalkylation procedures.

Continuous operation, or substantially continuous operation, is achieved by the use of a separate container to hold the alkylene oxide being employed, particularly propylene oxide. The container consists essentially of a laboratory bomb having a capacity of about one-half gallon, or somewhat in excess thereof. This bomb was equipped, also, with an inlet for charging, and an outlet tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use and the connections between the bomb and the autoclave were flexible stainless hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

With this particular arrangement practically all oxypropylations became uniform in that the reaction temperature could be held within a few degrees of any point selected in this particular range, for instance, in most cases I have selected a point of approximately 160° to 165° C., as being particularly desirable and stayed within the range of 155° to 180° almost invariably. The propylene oxide was forced in by means of nitrogen pressure as rapidly as it was absorbed, as indicated by the pressure gauge in the autoclave. In case the reaction slowed up so the temperature dropped much below the selected point of reaction, for instance, 160° C., then all that was required was that either cooling water was cut down or steam was employed, or the addition of propylene oxide speeded up, or electric heat used in addition to the steam, in order that the reaction procedures at or near the selected temperatures be maintained.

Inversely, if the reaction proceeded too fast the amount of reactant being added, i. e., propylene oxide, was cut down or electrical heat was cut off, or steam was reduced, or if need be, cooling water was run through both the jacket and the cooling coil. All these operations, of course, are dependent on the required number of conventional gauges, check valves, etc., and the entire equipment, as has been pointed out, is conventional and, as far as I am aware, can be furnished by at least two firms who specialize in the manufacture of this kind of equipment. As an illustration of such oxypropylation procedure the following examples are included.

*Example A*

The particular piece of equipment employed was an autoclave equipped additionally with an ordinary glass condenser, using a metal-to-glass contact. 189 grams (1 mole) tetraethylenepentamine were placed in the autoclave and reacted with 7 moles of glycide. The reaction took place rapidly and, in fact, the only precaution required was to add the glycide slowly enough and use sufficient cooling water so the temperature did not go over 130°–140° C. The glycide was added by means of the separatory funnel arrangement previously referred to. After this reaction was complete the separatory funnel arrangement and the condenser were closed and the vessel flushed out with nitrogen so it could be used as an autoclave during the next subsequent step. The bomb reservoir which served as a holder for propylene oxide (and which has been described previously) was charged with more than 1800 grams of propylene oxide so that 1740 grams could be withdrawn by difference and noted on the scale. It is inconvenient to attempt to withdraw all the propylene oxide from the bomb reservoir for the reason that the tube does not extend to the very bottom of the bomb. In this particular experiment the stirring speed employed was approximately 300 R. P. M. The temperature in the autoclave was raised to 150° C. before any oxide was added. In the instant series of experiments the products were invariably liquid and there was no difficulty in subsequent steps if the addition of sodium methylate was required as stirring would distribute or dissolve the catalyst. No catalyst was added except as noted and, needless to say, it was not required in this initial step due to the basicity of the initial reactants.

Before starting the experiment a range of 150° to 180° C. was selected. Subsequent control of valves, reactor inlet, cooling water, steam, etc., are intended to keep the experiment within this range. When the temperature reached 150° C., and the catalyst was thoroughly dissolved as noted, propylene oxide was forced in using nitrogen pressure on the reservoir bomb. The pressure during the addition of the propylene oxide stayed comparatively low for the reason that the reaction was instant and there was no opportunity for unreacted propylene oxide to heat up and show pressure. The actual gauge pressure was approximately 53 pounds, or less.

The nitrogen pressure on the propylene oxide reservoir was 100 pounds which meant that due to the conventional check gauge arrangement propylene oxide could not be forced into the autoclave for reaction if at any time the pressure in the reactor moved above 100 pounds gauge pressure. In actual operation the 1740 grams of propylene oxide were added in approximately ½ hour and at no time did the pressure go higher than 53 pounds, and the reaction operated smoothly; at no time did it go past the preselected maximum point of 180° C.

The bulk of the reaction took place at a range of 150° to 160° C. It will be noted that the amount of propylene oxide added was 30 moles for each mole of glycide-treated tetraethylenepentamine. The yield of the product at the end of the first stage was 2447 grams, which figure also represented the molecular weight. The product was prepared essentially to be used as an intermediate product for further oxypropylation as described in subsequent experiments. The molal ratio of propylene oxide to initial reactant was 30 to 1.

*Example B*

The product referred to in Example A, preceding, was split into halves and one-half, that is 1224 grams, was treated with 1160 grams of propylene oxide in substantially the same manner as described in Example A. For practical purposes the operating conditions such as temperature, pressure, etc., were the same as in Example A, preceding. No catalyst was added since the product was still sufficiently alkaline. The reaction yielded 2384 grams of a product having a molecular weight of 4767. The molal ratio of propylene oxide to initial reactant was 70 to 1.

*Example C*

The product obtained in Example B, preceding, was split in two and one-half, or 1192, grams, representing .25 mole of the initial reactant, was treated with 580 grams of propylene oxide to yield 1772 grams of reaction product. In this case approximately 1%, or 15 grams, of sodium methylate was added and stirred into the mass prior to reaction with propylene oxide. The operating conditions as far as temperature, pressure, and time, are concerned were substantially the same as in Example A. The molecular weight of the resulting compound was 7087. The product was water-insoluble, and the molal ratio was 110 to 1.

*Example D*

One-half of the product described in Example C, preceding, or 836 grams, equivalent to .125 mole of the initial raw material, was treated with 290 grams of propylene oxide without the addition of any more catalyst. The yield was 1126 grams of a product having a molecular weight of 9407. This reaction took place in less time than the previous reaction because the amount of propyleneoxide added was smaller, in fact, it took place in less than an hour. In all other respects the operating conditions were the same as described in Example A, preceding. The product was water-insoluble. The molal ratio was 150 to 1.

*Example E*

All of the above reactant was permitted to remain in the autoclave and a small amount of sodium methylate (approximately 5 grams) was added to speed up the reaction in the present stage. To the 1126 grams in the autoclave there were added 290 grams more of propylene oxide so as to yield 1416 grams of final product. The reactant taken, of course, still represented .125 mole of the initial reactant. The molecular weight of the final product was 11,727. The product was water-insoluble. The reaction time was approximately ¾ hour but otherwise the conditions of reaction were substantially the same as in Example A, preceding. The molal ratio was 190 to 1.

This particular product was particularly effective on some emulsions found in West Texas and also in the Hobbs, New Mexico, oil fields.

*Example F*

The entire contents, to wit, 1416 grams, were permitted to stay in the autoclave without the addition of any more catalyst. 290 grams more of propylene oxide were added. The operating conditions were substantially the same as in Example A, and the final yield was 1706 grams. This particular product had a molecular weight of 14,047. The molal ratio was 230 to 1.

When tested on the same oils as mentioned in the previous example it did not seem to be quite as effective as a demulsifier.

It is to be noted that in a compound or mixture having an average molecular weight of 12,500 the original tetraethylenepentamine represents only about 1½% of the final product, and that the original glycide employed represents about 4% of the final product.

*Example G*

The same procedure was employed as in the six examples preceding, except that triethylenetetramine was substituted for tetraethylenepentamine. This particular amine was treated with 5 moles of glycide instead of 7 moles. From this point on the same procedure was followed and the same steps were used so as to obtain the same molal ratio. The resultant products were all similar to those obtained in Examples A through F, and water-insolubility appeared at the same molal weight range. On the emulsions previously referred to this particular derivative did not seem quite as effective as the corresponding derivative obtained from tetraethylenepentamine.

A number of additional products are presented in tabular form in the subsequent tables.

TABLE 1

| Example No. | Polyamine | Molecular Wt. | Amt. taken in gms. | Amt. Glycide in gms. | Molal Ratio | Molecular Wt. of Derivative | No. of Reactive Hydrogen Atoms per Molecule Prior to Glycide Treatment | No. of Reactive Hydrogen Atoms per Molecule After Glycide Treatment |
|---|---|---|---|---|---|---|---|---|
| 1 | Diethylene triamine | 103 | 103 | 74 | 1:1 | 177 | 5 | 6 |
| 2 | ...do... | 103 | 103 | 148 | 2:1 | 251 | 5 | 7 |
| 3 | Triethylene tetramine | 146 | 146 | 74 | 1:1 | 220 | 6 | 7 |
| 4 | ...do... | 146 | 146 | 148 | 2:1 | 294 | 6 | 8 |
| 5 | ...do... | 146 | 146 | 296 | 4:1 | 442 | 6 | 10 |
| 6 | Propylene diamine | 74 | 74 | 148 | 2:1 | 222 | 4 | 6 |
| 7 | ...do... | 74 | 74 | 222 | 3:1 | 296 | 4 | 7 |
| 8 | Dipropylene triamine | 131 | 131 | 370 | 5:1 | 501 | 5 | 10 |
| 9 | ...do... | 131 | 131 | 740 | 10:1 | 871 | 5 | 15 |
| 10 | Tetraethylenepentamine | 189 | 189 | 74 | 1:1 | 263 | 7 | 8 |
| 11 | ...do... | 189 | 189 | 148 | 2:1 | 337 | 7 | 9 |
| 12 | ...do... | 189 | 189 | 222 | 3:1 | 411 | 7 | 10 |
| 13 | HB Polyamine [1] | 275 | 275 | 74 | 1:1 | 349 | 9 | 10 |
| 14 | ...do [1] | 275 | 275 | 148 | 2:1 | 423 | 9 | 11 |
| 15 | ...do [1] | 275 | 275 | 222 | 3:1 | 497 | 9 | 12 |
| 16 | Monoethyleneglycol ether of tetraethylenepentamine [2] | 233 | 233 | 518 | 7:1 | 751 | 7 | 14 |
| 17 | Diethyleneglycol ether of tetraethylenepentamine [3] | 277 | 77 | 518 | 7:1 | 795 | 7 | 14 |
| 18 | Monoacetyl derivative of tetraethylenepentamine | 231 | 231 | 444 | 6:1 | 675 | 6 | 12 |
| 19 | Reaction Product of dipropylene triamine (1 mole) and ethylene imine (2 moles) | 150 | 150 | 444 | 6:1 | 594 | 6 | 12 |
| 20 | ...do... | 217 | 217 | 518 | 7:1 | 735 | 7 | 14 |
| 21 | Reaction product of tetraethylene pentamine (1 mole) and ethylene imine (5 moles) | 404 | 404 | 888 | 12:1 | 1,292 | 12 | 24 |
| 22 | Tetraethylenepentamine | 189 | 139 | 592 | 8:1 | 781 | 7 | 15 |
| 23 | ...do... | 189 | 189 | 740 | 10:1 | 929 | 7 | 17 |
| 24 | ...do... | 189 | 189 | 1,036 | 14:1 | 1,225 | 7 | 21 |

[1] HB amine is the trade name for a high boiling polyamine residue remaining after the distillation of tetraethylene pentamine. It is undoubtedly a mixture of the immediately higher homologues of tetraethylenepentamine, and the above value of 275 molecular weight is an approximation corresponding roughly to hexaethylene heptamine.

[2] Obtained by reaction of one mole of glycide and one mole of tetraethylenepentamine.

[3] Obtained by reaction between 2 moles of glycide and one mole of tetraethylenepentamine.

TABLE 2

| Ex. No. | Prior Deriv. No. | Molec. Wt. | No. of Reactive Hydrogen Atoms per Molecule | Amt. Taken, Gms. | Sod. Meth. Added If Any, Gms. | Propylene Oxide Added, Gms. | Molal Ratio per Initial Molecule | Molec. Weight of Derivative |
|---|---|---|---|---|---|---|---|---|
| 25 | 1 | 177 | 6 | 177 | None | 1,160 | 20:1 | 1,337 |
| 26 | 2 | 251 | 7 | 251 | ...do | 1,160 | 20:1 | 1,411 |
| 27 | 3 | 220 | 7 | 220 | ...do | 1,160 | 20:1 | 1,380 |
| 28 | 4 | 294 | 8 | 294 | ...do | 1,160 | 20:1 | 1,454 |
| 29 | 5 | 442 | 10 | 442 | ...do | 1,160 | 20:1 | 1,602 |
| 30 | 6 | 222 | 6 | 222 | ...do | 1,160 | 20:1 | 1,382 |
| 31 | 7 | 296 | 7 | 296 | ...do | 1,160 | 20:1 | 1,456 |
| 32 | 8 | 501 | 10 | 501 | ...do | 1,160 | 20:1 | 1,661 |
| 33 | 9 | 871 | 15 | 871 | ...do | 1,160 | 20:1 | 2,031 |
| 34 | 10 | 263 | 8 | 263 | ...do | 1,160 | 20:1 | 1,423 |
| 35 | 11 | 337 | 9 | 339 | ...do | 1,160 | 20:1 | 1,497 |
| 36 | 12 | 411 | 10 | 411 | ...do | 1,160 | 20:1 | 1,571 |
| 37 | 13 | 349 | 10 | 349 | ...do | 1,160 | 20:1 | 1,509 |
| 38 | 14 | 423 | 11 | 423 | ...do | 1,160 | 20:1 | 1,583 |
| 39 | 15 | 497 | 12 | 497 | ...do | 1,160 | 20:1 | 1,657 |
| 40 | 16 | 751 | 14 | 751 | ...do | 1,160 | 20:1 | 1,911 |
| 41 | 17 | 795 | 14 | 795 | ...do | 1,160 | 20:1 | 1,955 |
| 42 | 18 | 695 | 12 | 695 | ...do | 1,160 | 20:1 | 1,835 |
| 43 | 19 | 594 | 12 | 594 | ...do | 1,160 | 20:1 | 1,754 |
| 44 | 20 | 735 | 14 | 735 | ...do | 1,160 | 20:1 | 1,895 |
| 45 | 21 | 1,292 | 12 | 1,292 | ...do | 1,160 | 20:1 | 2,452 |
| 46 | 22 | 781 | 7 | 781 | ...do | 1,160 | 20:1 | 1,941 |
| 47 | 23 | 929 | 7 | 929 | ...do | 1,160 | 20:1 | 2,089 |
| 48 | 24 | 1,225 | 7 | 1,225 | ...do | 1,160 | 20:1 | 2,385 |

TABLE 3

| Ex. No. | Prior Deriv. No. | Molec. Wt. | No. of Reactive Hydrogen Atoms per Molecule | Amt. Taken, Gms. | Sod. Meth. Added If Any, Gms. | Propylene Oxide Added, Gms. | Molal Ratio per Initial Molecule | Molec. Wt. of Derivative | Water-Soluble |
|---|---|---|---|---|---|---|---|---|---|
| 49 | 25 | 1,337 | 6 | 669 | 15 | 1,740 | 80:1 | 4,817 | No |
| 50 | 26 | 1,411 | 7 | 706 | 15 | 1,740 | 80:1 | 4,891 | No |
| 51 | 27 | 1,380 | 7 | 690 | 15 | 1,740 | 80:1 | 4,860 | No |
| 52 | 28 | 1,454 | 8 | 727 | 15 | 1,740 | 80:1 | 4,934 | No |
| 53 | 29 | 1,602 | 10 | 801 | 15 | 1,740 | 80:1 | 5,082 | No |
| 54 | 30 | 1,382 | 6 | 691 | 15 | 1,740 | 80:1 | 4,862 | No |
| 55 | 31 | 1,456 | 7 | 728 | 15 | 1,740 | 80:1 | 4,936 | No |
| 56 | 32 | 1,661 | 10 | 831 | 15 | 1,740 | 80:1 | 5,141 | No |
| 57 | 33 | 2,031 | 15 | 1,016 | 15 | 1,740 | 80:1 | 5,511 | No |
| 58 | 34 | 1,423 | 8 | 712 | 15 | 1,740 | 80:1 | 4,903 | No |
| 59 | 35 | 1,497 | 9 | 749 | 15 | 1,740 | 80:1 | 4,977 | No |
| 60 | 36 | 1,571 | 10 | 786 | 15 | 1,740 | 80:1 | 5,051 | No |
| 61 | 37 | 1,509 | 10 | 755 | 15 | 1,740 | 80:1 | 4,989 | No |
| 62 | 38 | 1,583 | 11 | 792 | 15 | 1,740 | 80:1 | 5,063 | No |
| 63 | 39 | 1,657 | 12 | 828 | 15 | 1,740 | 80:1 | 5,137 | No |
| 64 | 40 | 1,911 | 14 | 956 | 15 | 1,740 | 80:1 | 5,391 | No |
| 65 | 41 | 1,955 | 14 | 928 | 15 | 1,740 | 80:1 | 5,435 | No |
| 66 | 42 | 1,835 | 12 | 918 | 15 | 1,740 | 80:1 | 5,315 | No |
| 67 | 43 | 1,754 | 12 | 877 | 15 | 1,740 | 80:1 | 5,234 | No |
| 68 | 44 | 1,895 | 14 | 948 | 15 | 1,740 | 80:1 | 5,375 | No |
| 69 | 45 | 2,452 | 12 | 1,226 | 15 | 1,740 | 80:1 | 5,932 | No |
| 70 | 46 | 1,941 | 7 | 971 | 15 | 1,740 | 80:1 | 5,421 | No |
| 71 | 47 | 2,089 | 7 | 1,045 | 15 | 1,740 | 80:1 | 5,569 | No |
| 72 | 48 | 2,385 | 7 | 1,193 | 15 | 1,740 | 80:1 | 5,865 | No |

TABLE 4

| Ex. No. | Prior Deriv. No. | Molec. Wt. | No. of Reactive Hydrogen Atoms per Molecule | Amt. Taken, Gms. | Sod. Meth. Added If Any, Gms. | Propylene Oxide Added, Gms. | Molal Ratio per Initial Molecule | Molec. Wt. of Derivative | Water-Soluble |
|---|---|---|---|---|---|---|---|---|---|
| 73 | 49 | 4,817 | 6 | 1,205 | None | 580 | 120:1 | 7,137 | No |
| 74 | 50 | 4,891 | 7 | 1,223 | ...do | 580 | 120:1 | 7,211 | No |
| 75 | 51 | 4,860 | 7 | 1,215 | ...do | 580 | 120:1 | 7,180 | No |
| 76 | 52 | 4,934 | 8 | 1,234 | ...do | 580 | 120:1 | 7,254 | No |
| 77 | 53 | 5,082 | 10 | 1,271 | ...do | 580 | 120:1 | 7,402 | No |
| 78 | 54 | 4,862 | 6 | 1,216 | ...do | 580 | 120:1 | 7,182 | No |
| 79 | 55 | 4,936 | 7 | 1,234 | ...do | 580 | 120:1 | 7,256 | No |
| 80 | 56 | 5,141 | 10 | 1,286 | ...do | 580 | 120:1 | 7,461 | No |
| 81 | 57 | 5,511 | 15 | 1,378 | ...do | 580 | 120:1 | 7,831 | No |
| 82 | 58 | 4,903 | 8 | 1,226 | ...do | 580 | 120:1 | 7,223 | No |
| 83 | 59 | 4,977 | 9 | 1,245 | ...do | 580 | 120:1 | 7,397 | No |
| 84 | 60 | 5,051 | 10 | 1,263 | ...do | 580 | 120:1 | 7,371 | No |
| 85 | 61 | 4,989 | 10 | 1,248 | ...do | 580 | 120:1 | 7,309 | No |
| 86 | 62 | 5,063 | 11 | 1,266 | ...do | 580 | 120:1 | 7,383 | No |
| 87 | 63 | 5,137 | 12 | 1,284 | ...do | 580 | 120:1 | 7,457 | No |
| 88 | 64 | 5,391 | 14 | 1,398 | ...do | 580 | 120:1 | 7,711 | No |
| 89 | 65 | 5,435 | 14 | 1,334 | ...do | 580 | 120:1 | 7,755 | No |
| 90 | 66 | 5,315 | 12 | 1,329 | ...do | 580 | 120:1 | 7,635 | No |
| 91 | 67 | 5,234 | 12 | 1,309 | ...do | 580 | 120:1 | 7,554 | No |
| 92 | 68 | 5,375 | 14 | 1,344 | ...do | 580 | 120:1 | 7,695 | No |
| 93 | 69 | 5,932 | 12 | 1,483 | ...do | 580 | 120:1 | 8,252 | No |
| 94 | 70 | 5,421 | 7 | 1,356 | ...do | 580 | 120:1 | 7,741 | No |
| 95 | 71 | 5,569 | 7 | 1,393 | ...do | 580 | 120:1 | 7,889 | No |
| 96 | 72 | 5,865 | 7 | 1,467 | ...do | 580 | 120:1 | 8,185 | No |

TABLE 5

| Ex. No. | Prior Deriv. No. | Molec. Wt. | No. of Reactive Hydrogen Atoms per Molecule | Amt. Taken, Gms. | Sod. Meth. Added If Any, Gms. | Propylene Oxide Added, Gms. | Molal Ratio per Initial Molecule | Molec. Wt. of Derivative | Water-Soluble |
|---|---|---|---|---|---|---|---|---|---|
| 97 | 73 | 7,137 | 6 | 1,785 | 12.5 | 580 | 160:1 | 9,457 | No |
| 98 | 74 | 7,211 | 7 | 1,803 | 12.5 | 580 | 160:1 | 9,531 | No |
| 99 | 75 | 7,180 | 7 | 1,795 | 12.5 | 580 | 160:1 | 9,500 | No |
| 100 | 76 | 7,254 | 8 | 1,814 | 12.5 | 580 | 160:1 | 9,574 | No |
| 101 | 77 | 7,402 | 10 | 1,851 | 12.5 | 580 | 160:1 | 9,722 | No |
| 102 | 78 | 7,182 | 6 | 1,796 | 12.5 | 580 | 160:1 | 9,502 | No |
| 103 | 79 | 7,256 | 7 | 1,814 | 12.5 | 580 | 160:1 | 9,576 | No |
| 104 | 80 | 7,461 | 10 | 1,866 | 12.5 | 580 | 160:1 | 9,781 | No |
| 105 | 81 | 7,831 | 15 | 1,958 | 12.5 | 580 | 160:1 | 10,151 | No |
| 106 | 82 | 7,223 | 8 | 1,806 | 12.5 | 580 | 160:1 | 9,543 | No |
| 107 | 83 | 7,397 | 9 | 1,825 | 12.5 | 580 | 160:1 | 9,717 | No |
| 108 | 84 | 7,371 | 10 | 1,843 | 12.5 | 580 | 160:1 | 9,691 | No |
| 109 | 85 | 7,309 | 10 | 1,828 | 12.5 | 580 | 160:1 | 9,629 | No |
| 110 | 86 | 7,383 | 11 | 1,846 | 12.5 | 580 | 160:1 | 9,703 | No |
| 111 | 87 | 7,457 | 12 | 1,864 | 12.5 | 580 | 160:1 | 9,777 | No |
| 112 | 88 | 7,711 | 14 | 1,978 | 12.5 | 580 | 160:1 | 10,031 | No |
| 113 | 89 | 7,755 | 14 | 1,914 | 12.5 | 580 | 160:1 | 10,075 | No |
| 114 | 90 | 7,635 | 12 | 1,909 | 12.5 | 580 | 160:1 | 9,955 | No |
| 115 | 91 | 7,554 | 12 | 1,889 | 12.5 | 580 | 160:1 | 9,874 | No |
| 116 | 92 | 7,695 | 14 | 1,924 | 12.5 | 580 | 160:1 | 10,015 | No |
| 117 | 93 | 8,252 | 12 | 2,063 | 12.5 | 580 | 160:1 | 10,572 | No |
| 118 | 94 | 7,741 | 7 | 1,936 | 12.5 | 580 | 160:1 | 10,061 | No |
| 119 | 95 | 7,889 | 7 | 1,973 | 12.5 | 580 | 160:1 | 10,209 | No |
| 120 | 96 | 8,185 | 7 | 2,047 | 12.5 | 580 | 160:1 | 10,505 | No |

TABLE 6

| Ex. No. | Prior Deriv. No. | Molec. Wt. | No. of Reactive Hydrogen Atoms per Molecule | Amt. Taken, Gms. | Sod. Meth. Added If Any, Gms. | Propylene Oxide Added, Gms. | Molal Ratio per Initial Molecule | Molec. Wt. of Derivative | Water-Soluble |
|---|---|---|---|---|---|---|---|---|---|
| 121 | 97 | 9,457 | 6 | 1,183 | None | 290 | 200:1 | 11,777 | No |
| 122 | 98 | 9,531 | 7 | 1,192 | ...do... | 290 | 200:1 | 11,851 | No |
| 123 | 99 | 9,500 | 7 | 1,188 | ...do... | 290 | 200:1 | 11,820 | No |
| 124 | 100 | 9,574 | 8 | 1,197 | ...do... | 290 | 200:1 | 11,894 | No |
| 125 | 101 | 9,722 | 10 | 1,216 | ...do... | 290 | 200:1 | 12,042 | No |
| 126 | 102 | 9,502 | 6 | 1,188 | ...do... | 290 | 200:1 | 11,822 | No |
| 127 | 103 | 9,576 | 7 | 1,197 | ...do... | 290 | 200:1 | 11,896 | No |
| 128 | 104 | 9,781 | 10 | 1,223 | ...do... | 290 | 200:1 | 12,101 | No |
| 129 | 105 | 10,151 | 15 | 1,269 | ...do... | 290 | 200:1 | 12,471 | No |
| 130 | 106 | 9,543 | 8 | 1,193 | ...do... | 290 | 200:1 | 11,863 | No |
| 131 | 107 | 9,717 | 9 | 1,203 | ...do... | 290 | 200:1 | 12,037 | No |
| 132 | 108 | 9,691 | 10 | 1,214 | ...do... | 290 | 200:1 | 11,911 | No |
| 133 | 109 | 9,629 | 10 | 1,204 | ...do... | 290 | 200:1 | 11,949 | No |
| 134 | 110 | 9,703 | 11 | 1,213 | ...do... | 290 | 200:1 | 12,023 | No |
| 135 | 111 | 9,777 | 12 | 1,222 | ...do... | 290 | 200:1 | 12,097 | No |
| 136 | 112 | 10,031 | 14 | 1,279 | ...do... | 290 | 200:1 | 12,351 | No |
| 137 | 113 | 10,075 | 14 | 1,247 | ...do... | 290 | 200:1 | 12,395 | No |
| 138 | 114 | 9,955 | 12 | 1,245 | ...do... | 290 | 200:1 | 12,275 | No |
| 139 | 115 | 9,874 | 12 | 1,235 | ...do... | 290 | 200:1 | 12,194 | No |
| 140 | 116 | 10,015 | 14 | 1,252 | ...do... | 290 | 200:1 | 12,335 | No |
| 141 | 117 | 10,572 | 12 | 1,322 | ...do... | 290 | 200:1 | 12,892 | No |
| 142 | 118 | 10,061 | 7 | 1,258 | ...do... | 290 | 200:1 | 12,381 | No |
| 143 | 119 | 10,209 | 7 | 1,277 | ...do... | 290 | 200:1 | 12,529 | No |
| 144 | 120 | 10,505 | 7 | 1,314 | ...do... | 290 | 200:1 | 12,825 | No |

TABLE 7

| Ex. No. | Prior Deriv. No. | Molec. Wt. | No. of Reactive Hydrogen Atoms per Molecule | Amt. Taken, Gms. | Sod. Meth. Added If Any, Gms. | Propylene Oxide Added, Gms. | Molal Ratio per Initial Molecule | Molec. Wt. of Derivative | Water-Soluble |
|---|---|---|---|---|---|---|---|---|---|
| 145 | 121 | 11,777 | 6 | 1,473 | 8.0 | 290 | 240:1 | 14,097 | No |
| 146 | 122 | 11,851 | 7 | 1,482 | 8.0 | 290 | 240:1 | 14,171 | No |
| 147 | 123 | 11,820 | 7 | 1,478 | 8.0 | 290 | 240:1 | 14,140 | No |
| 148 | 124 | 11,894 | 8 | 1,487 | 8.0 | 290 | 240:1 | 14,214 | No |
| 149 | 125 | 12,042 | 10 | 1,506 | 8.0 | 290 | 240:1 | 14,362 | No |
| 150 | 126 | 11,822 | 6 | 1,478 | 8.0 | 290 | 240:1 | 14,142 | No |
| 151 | 127 | 11,896 | 7 | 1,487 | 8.0 | 290 | 240:1 | 14,216 | No |
| 152 | 128 | 12,101 | 10 | 1,513 | 8.0 | 290 | 240:1 | 14,421 | No |
| 153 | 129 | 12,471 | 15 | 1,559 | 8.0 | 290 | 240:1 | 14,791 | No |
| 154 | 130 | 11,863 | 8 | 1,483 | 8.0 | 290 | 240:1 | 14,183 | No |
| 155 | 131 | 12,037 | 9 | 1,493 | 8.0 | 290 | 240:1 | 14,357 | No |
| 156 | 132 | 11,911 | 10 | 1,504 | 8.0 | 290 | 240:1 | 14,231 | No |
| 157 | 133 | 11,949 | 10 | 1,494 | 8.0 | 290 | 240:1 | 14,269 | No |
| 158 | 134 | 12,023 | 11 | 1,503 | 8.0 | 290 | 240:1 | 14,343 | No |
| 159 | 135 | 12,097 | 12 | 1,512 | 8.0 | 290 | 240:1 | 14,417 | No |
| 160 | 136 | 12,351 | 14 | 1,569 | 8.0 | 290 | 240:1 | 14,671 | No |
| 161 | 137 | 12,395 | 14 | 1,537 | 8.0 | 290 | 240:1 | 14,715 | No |
| 162 | 138 | 12,275 | 12 | 1,535 | 8.0 | 290 | 240:1 | 14,595 | No |
| 163 | 139 | 12,194 | 12 | 1,525 | 8.0 | 290 | 240:1 | 14,514 | No |
| 164 | 140 | 12,335 | 14 | 1,542 | 8.0 | 290 | 240:1 | 14,655 | No |
| 165 | 141 | 12,892 | 12 | 1,612 | 8.0 | 290 | 240:1 | 15,212 | No |
| 166 | 142 | 12,381 | 7 | 1,548 | 8.0 | 290 | 240:1 | 14,701 | No |
| 167 | 143 | 12,529 | 7 | 1,567 | 8.0 | 290 | 240:1 | 14,849 | No |
| 168 | 144 | 12,825 | 7 | 1,604 | 8.0 | 290 | 240:1 | 15,145 | No |

It will be noted that sodium methylate or any other suitable catalyst, such as caustic soda or caustic potash, is used if required. The products obtained in these reactions are liquids varying from light cream color with a trace of amber, to dark amber products. The color seems to be determined by the final polyamine reactant and treatment with glycide and propylene oxide simply seems to dilute the color. The products, of course, can be bleached to practically water-white in the conventional manner using either charcoal or a bleaching clay. However, for technical purposes, such as use in demulsifiers, such refinement is not necessary.

In order to illustrate why the herein specified compounds or products are cogeneric mixtures and not single chemical compounds and why they must be described in terms of manufacture and molal ratio or percentage of reactants, reference is made to a monohydric alcohol or a secondary amine having a single reactive aminohydrogen atom. Needless to say, after the first mole of propylene oxide reacts with such amine the aminohydrogen atom is replaced by an alkanol radical. One of the simplest compounds herein contemplated as an initial reactant is ethylenediamine or hydroxyethyl ethylenediamine. In either instance there are at least 4 reactive hydrogen atoms. Other examples appearing elsewhere herein may have a dozen or more reactive hydrogen atoms as in the case of a mole of tetraethylenepentamine which has been treated with 7 moles of glycide. However, one need only consider what happens when a monohydric alcohol is subjected to oxyalkylation.

If one selects any hydroxylated compound and subjects such compound to oxyalkylation, such as oxyethylation or oxypropylation, it becomes obvious that one is really producing a polymer of the alkylene oxide except for the terminal group. This is particularly true where the amount of oxide added is comparatively large, for instance, 10, 20, 30, 40, or 50 units. If such a compound is subjected to oxyethylation so as to introduce 30 units of ethylene oxide it is well known that one does not obtain a single constituent which, for sake of convenience may be indicated as $RO(C_2H_4O)_{30}H$. Instead, one obtains a cogeneric mixture of closely related homologues in which the formula may be shown as the following: $RO(C_2H_4O)_nH$, wherein $n$, as far as the statistical average goes, is 30, but the individual members present in significant amount may vary from instances where $n$ has a value of 25 and perhaps less, to a point where $n$ may represent 35 or more. Such mixture is, as stated, a cogeneric closely related series of touching homologues compounds. Considerable investigation has been made in regard to the distribution curves for linear polymers. Attention is directed to the article entitled "Fundamental principles of condensation polymerization," by Paul J. Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description.

What has been said in regard to a monohydric compound, of course, is multiplied many, many times in the case of a tetrahydric compound and a hexahydric compound, or one having even a larger number of hydroxyls. This is particularly true when enough propylene oxide is added to give, at least on a statistical basis, assuming complete reaction, a compound having a molecular weight within the range previously specified.

Basically, the compounds herein described owe their peculiar properties to a number of factors previously enumerated, at least in part; (a) size of molecule; (b) shape of molecule as far as space configuration goes; (c) absence of a single hydrophobe group having as many as 8 uninterrupted carbon atoms in a single radical; (d) substantial insolubility in water; and (e) such combination being obtained by the action of propylene oxide alone for all practical purposes.

Actually, it can be seen that certain variations could be made without detracting from the spirit of the invention as, for example, one could start with a material such as the glycide-treated tetraethylenepentamine as described in Example A, preceding, and treat such product with 14 moles of ethylene oxide and then with propylene oxides or one might treat such product with 14 moles of propylene oxide and then with 14 moles of ethylene oxide, and then proceed with the subsequent oxypropylation step.

Actually, a mole or several moles of glycide could be used to interrupt the propylene oxide chain. Such variation does not depart from such invention and is included in the expression "oxypropylation" for reasons which require no further explanation.

The same thing is true if at some stage in oxypropylation one injected one or two ethylene radicals which would not offset other factors which complete the overall structure, such as molecular size, insolubility in water, etc. If one used a mole of butylene oxide for each polyamine again one would get the same effect for the reason that the overall picture has not been changed and there is no departure from the spirit of the invention. For that matter, one might use a few moles of ethylene oxide and a few moles of butylene oxide.

Basically, a comparatively simple low molal water-soluble polyamine of the kind specified is transformed into a high molal water-insoluble compound having a molecular weight of several thousand up to 25,000 or 30,000, and such insolubility is brought about substantially by the use of propylene oxide alone. The preferred range of molecular weight is in the neighborhood of 4,000 or thereabouts, to 14,000 or thereabouts.

My preferred reactants are prepared from polyamines available in the open market, such as the polyethyleneamines or the polypropyleneamines; and everything else being equal, I prefer to use those of the higher molecular weights, and particularly after treatment with at least sufficient glycide to convert all the amino hydrogen atoms into alcohol radicals.

PART 3

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agents of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000, as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example, by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels' to 2000 barrels' capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline oil or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example E, with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e. cost.

As noted above, the products herein described may be used not only in diluted form, but also may be used admixed with some other chemical demulsifier. For example, a mixture which exemplifies such combination is the following:

Oxypropylated derivative, for example, the product described as Example E, 30%;

A cyclohexylamine salt of a polypropylated naphthalene monosulfonic acid, 20%;

An oil-soluble petroleum sulfonic acid sodium salt, 20%;

Isobutyl alcohol, 5%;

High boiling aromatic solvent, 25%.

The above proportions are all weight per cents.

Having thus described my invention, what I claim as new and desire to secure by Letters Patent, is

1. A process for breaking petroleum emulsions of the water-in-oil type characterized by subjecting the emulsion to the action of a demulsifier including high molal oxypropylation derivatives of monomeric polyamino compounds, with the proviso that (a) the initial polyamino rectant be free from any radical having at least 8 uninterrupted carbon atoms; (b) the initial polyamino reactant have a molecular weight of not over 2,000 and at least a plurality of reactive hydrogen atoms, at least part of which are an integral part of a glycide radical obtained by the reaction of at least one mole of glycide on a polyamino compound; (c) the initial polyamino reactant must be water-soluble; (d) the oxypropylation end product must be water-insoluble; (e) the oxypropylation end product be within the molecular weight range of 2000 to 30,000 on an average statistical basis; (f) the solubility characteristics of the oxypropylation end product in respect to water must be substantially the result of the oxypropylation step; (g) the ratio of propylene oxide per initial reactive hydrogen atom must be within the range of 7 to 70; (h) the initial polyamino reactant must represent not more than 20% by weight of the oxypropylation end product on a statistical basis; (i) the preceding provisos are based on the assumption of complete reaction involving the propylene oxide and initial glycide-treated polyamino reactant. (j) the polyamino reactant must contain at least one basic nitrogen atom; and (k) the nitrogen atoms are linked by a carbon atom chain.

2. A process for breaking petroleum emulsions of the water-in-oil type characterized by subjecting the emulsion to the action of a demulsifier including high molal oxypropylation derivatives of monomeric polyamino compounds, with the proviso that (a) the initial polyamino reactant be free from any radical having at least 8 uninterrupted carbon atoms; (b) the initial polyamino reactant have a molecular weight of not over 2,000 and at least a plurality of reactive hydrogen atoms, at least part of which are an integral part of a glycide radical obtained by the reaction of at least one mole of glycide on a polyamino compound; (c) the initial polyamino reactant must be water-soluble; (d) the oxypropylation end product must be water-insoluble; (e) the oxypropylation end product be within the molecular weight range of 2000 to 30,000 on an average statistical basis; (f) the solubility characteristics of the oxypropylation end product in respect to water must be substantially the result of the oxypropylation step; (g) the ratio of propylene oxide per initial reactive hydrogen atom must be within the range of 7 to 70; (h) the initial polyamino reactant must represent not more than 20% by weight of the oxypropylation end product on a statistical basis; (i) the preceding provisos are based on the assumption of complete reaction involving the propylene oxide and initial glycide-treated polyamino reactant; (j) the polyamino reactant must contain at least a plurality of basic nitrogen atoms; and (k) the nitrogen atoms are linked by a carbon atom chain.

3. The process of claim 2 with the provisio that the polyamino compound be a polyalkylene amino compound.

4. The process of claim 2 with the proviso that the polyamino compound be a polyethylene amino compound.

5. The process of claim 2 with the proviso that the polyamino compound be a polyethylene amino compound, and with the further proviso that the molecular weight range be within the ratio of 4,000 to 14,000.

6. The process of claim 2 with the proviso that the polyamino compound is glycide-treated triethylenetetramine, and with the further proviso that the molecular weight range be within the ratio of 4,000 to 14,000.

7. The process of claim 2 with the proviso that the polyamino compound is glycide-treated tetraethylenepentamine, and with the further proviso that the melocular weight range be within the ratio of 4,000 to 14,000.

8. The process of claim 2 with the proviso that the polyamino compound is a glycide-treated high boiling residual polyethylene amino compound having more than 5 nitrogen atoms per molecule, and with the further proviso that the molecular weight range be within the ratio of 4,000 to 14,000.

MELVIN DE GROOTE.

REFERENCES CITED

The following references are of record in the file of this patent:

UNITED STATES PATENTS

| Number | Name | Date |
| --- | --- | --- |
| 2,233,383 | De Groote et al | Feb. 25, 1941 |
| 2,243,329 | De Groote et al | May 27, 1941 |
| 2,262,358 | De Groote et al | Nov. 11, 1941 |
| 2,262,736 | De Groote et al | Nov. 11, 1941 |
| 2,262,743 | De Groote et al | Nov. 11, 1941 |
| 2,290,154 | Blair | July 21, 1942 |